(12) United States Patent
Akiguchi et al.

(10) Patent No.: US 12,012,279 B2
(45) Date of Patent: Jun. 18, 2024

(54) ARTICLE PROCESSING APPARATUS

(71) Applicant: ISHIDA CO., LTD., Kyoto (JP)

(72) Inventors: Shogo Akiguchi, Ritto (JP); Mikio Kishikawa, Ritto (JP); Kazuki Tani, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 0 days.

(21) Appl. No.: 18/048,402

(22) Filed: Oct. 20, 2022

(65) Prior Publication Data

US 2023/0133121 A1 May 4, 2023

(30) Foreign Application Priority Data

Oct. 28, 2021 (JP) ................................ 2021-176170

(51) Int. Cl.
*B65G 47/14* (2006.01)
*B65D 88/32* (2006.01)
(Continued)

(52) U.S. Cl.
CPC ............. *B65D 88/64* (2013.01); *B65D 88/32* (2013.01)

(58) Field of Classification Search
CPC ...... B65D 88/64; B65D 88/32; G01G 19/393; G01G 19/387; G01G 21/22; B67D 3/00;
(Continued)

(56) References Cited

U.S. PATENT DOCUMENTS

| 748,494 | A | * | 12/1903 | Gansen | ................ | B67D 3/0029 |
| | | | | | | 296/100.06 |
| 1,359,730 | A | * | 11/1920 | Norton | .................... | B67C 11/04 |
| | | | | | | 141/345 |

(Continued)

FOREIGN PATENT DOCUMENTS

| JP | 2009-258040 A | | 11/2009 | |
| JP | 2009258040 A | * | 11/2009 | ............... B65B 1/30 |
| JP | 2021-021609 A | | 2/2021 | |

OTHER PUBLICATIONS

The extended European search report issued by the European Patent Office on Jan. 4, 2023, which corresponds to European Patent Application No. 22200150.5-1001 and is related to U.S. Appl. No. 18/048,402.

*Primary Examiner* — Donnell A Long
(74) *Attorney, Agent, or Firm* — Studebaker & Brackett PC

(57) ABSTRACT

In an article processing apparatus (1), a plurality of hoppers (12) are disposed in a circular shape and each of the plurality of hoppers (12) causes an article (100) received from an upstream side to temporarily stay and then discharges the article (100) toward a discharge opening (20) on a downstream side. Each of the hoppers (12) includes: a body portion (12A); a slide portion (12B) provided on a downstream side of the body portion (12A), and having a slide surface (120) extending continuously from the body portion (12A); and a gate (12C) provided on the body portion (12A) to switch between a first state where the gate (12C) causes the article (100) to stay in the body portion (12A) and a second state where the gate (12C) releases the staying of the article (100) to cause the article (100) to slide down from the body portion (12A). The slide portion (12B) has a length (L) or an angle (A) with respect to a horizontal direction (H) of a path along which the article (100) slides down the slide surface (120), takes off from a downstream end portion (120E) of the slide portion (12B), freely falls in a space (S) where the slide surface (120) does not exist, and then reaches the discharge opening (20), in the second state.

9 Claims, 7 Drawing Sheets

(51) Int. Cl.
*B65D 88/64* (2006.01)
*B65D 90/58* (2006.01)

(58) Field of Classification Search
CPC ... B67D 3/0029; B67D 3/0032; B67D 3/0035
See application file for complete search history.

(56) References Cited

U.S. PATENT DOCUMENTS

| | | | | |
|---|---|---|---|---|
| 4,337,943 | A | * | 7/1982 | Stewart ................ A63D 15/006 473/2 |
| 5,339,996 | A | * | 8/1994 | Dubbert ................. B65D 88/52 414/498 |
| 5,702,034 | A | * | 12/1997 | Semenenko ........... B65D 19/18 222/143 |
| 2012/0145466 | A1 | * | 6/2012 | Kishikawa ........... G01G 19/393 177/145 |
| 2018/0010955 | A1 | * | 1/2018 | Kishikawa ............. G01G 13/24 |
| 2022/0373173 | A1 | * | 11/2022 | Chlebovec ........... B65G 11/026 |

* cited by examiner

ARTICLE PROCESSING APPARATUS

CROSS-REFERENCE TO RELATED APPLICATIONS

This application is based upon and claims the benefit of priority from Japanese Patent Application No. 2021-176170 filed on Oct. 28, 2021 in Japan, the entire contents of which are incorporated herein by reference.

TECHNICAL FIELD

The present invention relates to an article processing apparatus.

BACKGROUND ART

In the related art, an article processing apparatus having a structure in which articles discharged from a hopper slide down a chute to flow to a discharge opening has been known (refer to, for example, JP 2021-21609 A).

SUMMARY OF THE INVENTION

Technical Problem

However, articles that are prolate ellipsoidal objects like rugby balls, such as baby carrots, gummies, and wieners, bounce randomly inside the chute, thereby causing a bottleneck when high-speed weighing is performed, which is a problem.

Therefore, the present invention is conceived in view of the foregoing problem, and an object of the present invention is to provide an article processing apparatus capable of performing high-speed weighing and keeping the height down low.

Solution to Problem

An article processing apparatus according to an embodiment is summarized in that a plurality of hoppers are disposed in a circular shape and each of the plurality of hoppers causes an article received from an upstream side to temporarily stay and then discharges the article toward a discharge opening on a downstream side, wherein each of the hoppers includes: a body portion; a slide portion provided on a downstream side of the body portion, and having a slide surface extending continuously from the body portion; and a gate provided on the body portion to switch between a first state where the gate causes the article to stay in the body portion and a second state where the gate releases the staying of the article to cause the article to slide down from the body portion, and the slide portion has a length or an angle with respect to a horizontal direction of a path along which the article slides down the slide surface, takes off from a downstream end portion of the slide portion, freely falls in a space where the slide surface does not exist, and then reaches the discharge opening, in the second state.

Advantageous Effects of Invention

According to the present invention, it is possible to provide an article processing apparatus capable of performing high-speed weighing and keeping the height down low.

DESCRIPTION OF EMBODIMENTS

Figure 1:
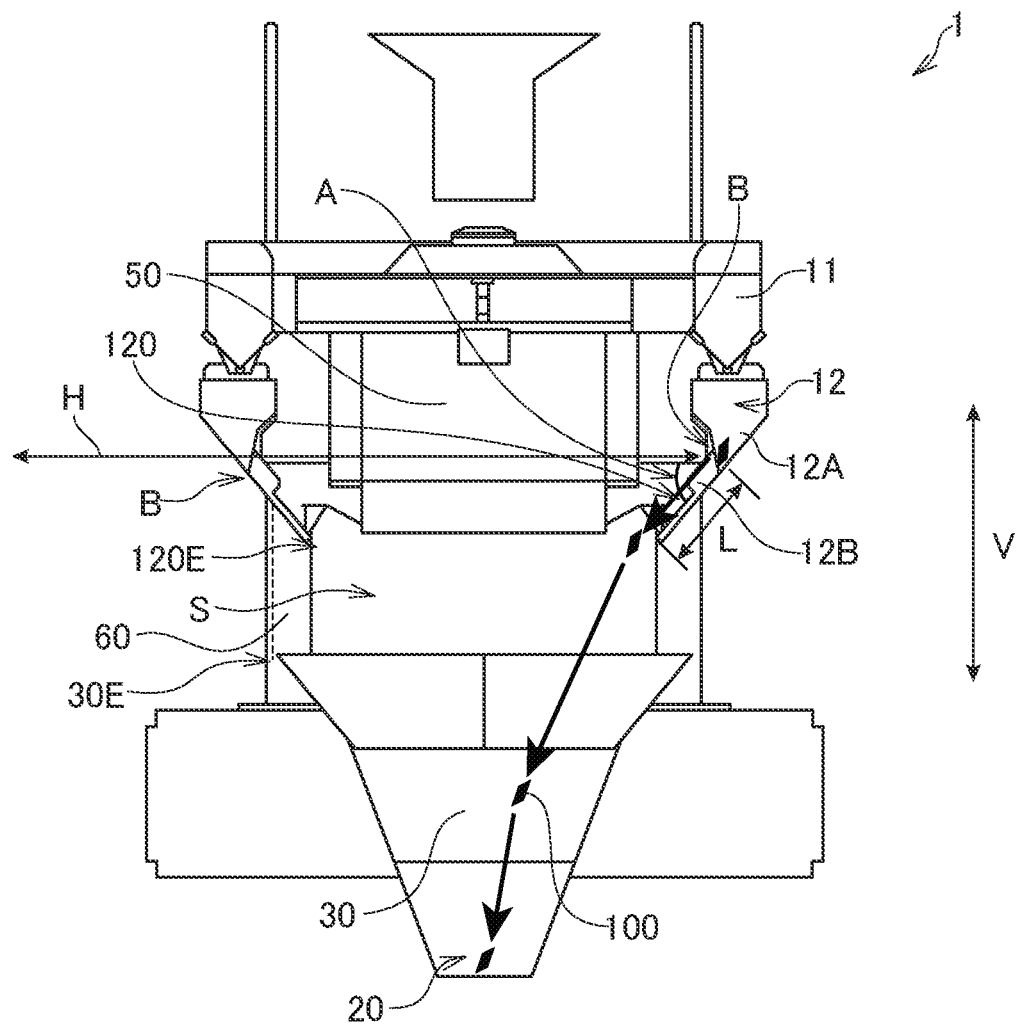
FIG. 1 is a view for describing one example of an overall configuration of an article processing apparatus according to one embodiment.

Hereinafter, the present embodiment will be described in detail with reference to the attached drawings. In the following description of the drawings, the same or similar parts are denoted by the same or similar reference symbols. However, note that the drawings are schematic, and ratios of dimensions are different from actual ones. Therefore, specific dimensions and the like are determined in consideration of the following description. Moreover, there may be portions where dimensional relationships or proportions are different among the drawings. In this specification and the drawings, elements having substantially the same function and configuration are denoted by the same reference numerals to omit redundant description, and elements not directly related to the present invention are omitted.

First Embodiment

Hereinafter, an article processing apparatus 1 according to a first embodiment of the present invention will be described with reference to FIGS. 1 to 7.

In the present embodiment, a case where the article processing apparatus 1 is a weighing device configured to weigh mass values of articles using a Roberval mechanism will be described as an example, but the present invention is not limited to such a case.

As illustrated in FIG. 1, the article processing apparatus 1 according to the present embodiment includes a plurality of pool hoppers 11, a plurality of weighing hoppers 12, and a chute 30.

The articles supplied from a trough (not illustrated) temporarily stay in the pool hoppers 11. Gates (not illustrated) are provided at lower portions of the respective pool hoppers 11, and when the gates are opened and closed, the articles (object to be weighted) staying in the pool hoppers 11 are discharged to the weighing hoppers 12 provided below the gates.

For example, such articles are food articles that are prolate ellipsoidal objects like rugby balls, such as baby carrots, gummies, and wieners. However, the articles are not limited to these.

The articles discharged by the pool hoppers 11 temporarily stay in the weighing hoppers 12. Gates 12C (to be described later) are provided at lower portions of the respective weighing hoppers 12, and when the gates 12C are opened and closed, the articles staying in the weighing hoppers 12 are discharged to a discharge opening 20 on a downstream side of the weighing hoppers 12.

Here, it is assumed that the plurality of pool hoppers 11 and the plurality of weighing hoppers 12 are disposed in a circular shape.

Figure 2:
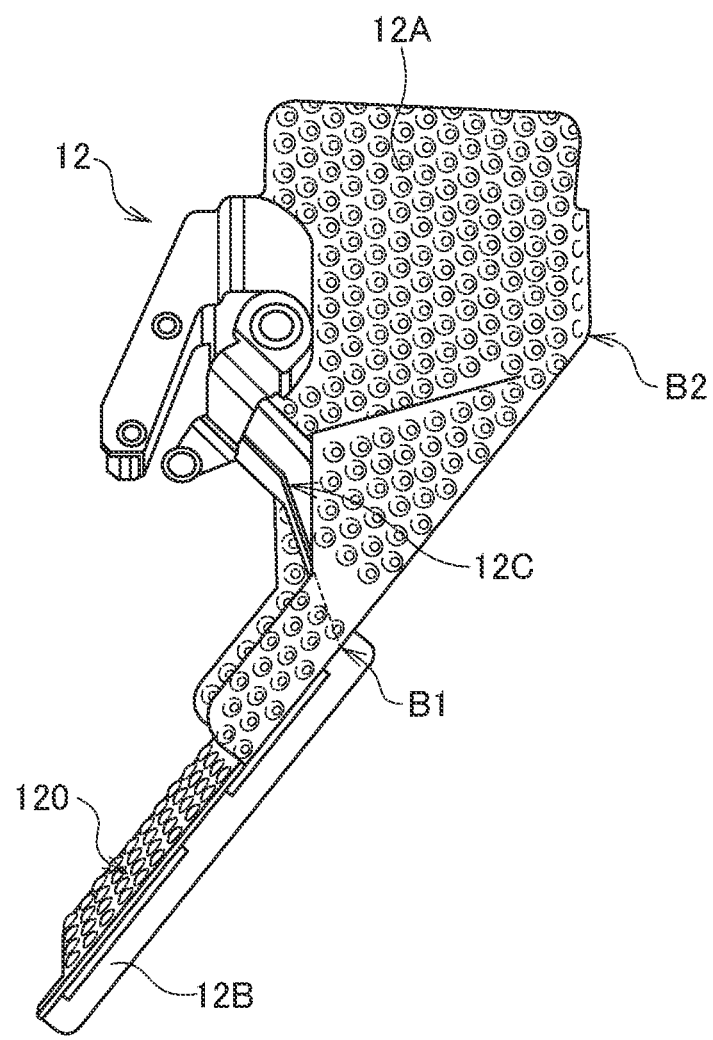
FIG. 2 is a view for describing one example of a hopper of the article processing apparatus according to one embodiment.

As illustrated in FIG. 2, each of the plurality of weighing hoppers 12 includes a body portion 12A, a slide portion 12B, and the gate 12C.

The slide portion 12B is provided on a downstream side of the body portion 12A, and has a slide surface 120 extending continuously from the body portion 12A.

The gate 12C is provided on the body portion 12A to switch between a first state where the gate 12C causes articles 100 to stay in the body portion 12A and a second state where the gate 12C releases the staying of the articles 100 to cause the articles 100 to slide down from the body portion 12A. The gate 12C is a gate that opens and closes inward with respect to the article processing apparatus 1.

Here, as illustrated in FIG. 1, the slide portion 12B has a length L or an angle A with respect to a horizontal direction H of a path along which the articles 100 slide down the slide surface 120, take off from a downstream end portion 120E, freely fall in a space S where the slide surface 120 does not exist, and then reach the discharge opening 20, in the second state described above.

Namely, in the article processing apparatus 1 according to the present embodiment, in order to cause the articles 100 to fall without contacting the chute 30 as much as possible, the length L of the slide surface 120 is set to be longer than in an article processing apparatus of the related art.

In addition, in the article processing apparatus 1 according to the present embodiment, in order to keep the height down low, the angle A with respect to the horizontal direction H is set to be smaller than in the article processing apparatus of the related art.

Incidentally, the space S represents a path connecting the downstream end portion 120E of the slide portion 12B and the discharge opening 20, and in such a path (space S), nothing exists that interferes with the free fall of the articles 100.

According to such a configuration, since the articles 100 can freely fall from the slide surface 120 in the space S and reach the discharge opening 20, the bouncing of the articles 100 inside the chute 30 can be suppressed, and high-speed weighing can be realized.

In addition, according to such a configuration, the height of the article processing apparatus 1 can be kept down low by reducing the angle A with respect to the horizontal direction H.

In addition, as illustrated in FIG. 1, the chute 30 may be disposed around the discharge opening 20 in a state where the chute 30 is separated from the hopper 12 by the space S where the slide surface 120 does not exist in a vertical direction V.

Here, as illustrated in FIG. 1, in a side view of the article processing apparatus 1, left and right end portions 30E of the chute 30 may be located between the downstream end portion 120E of the slide portion 12B and a boundary B between the body portion 12A and the slide portion 12B.

According to such a configuration, since the left and right end portions 30E of the chute 30 are disposed outside the downstream end portion 120E of the slide portion 12B, a situation where the articles 100 spill over the outside of the chute 30 can be avoided as much as possible.

In addition, according to such a configuration, since the left and right end portions 30E of the chute 30 are disposed inside the boundary B between the body portion 12A and the slide portion 12B, the space S described above can be secured, and cleanability and workability can be improved.

In addition, according to such a configuration, a chute of a size according to the related art is not required, and the chute 30 of a minimum required size may be simply prepared, so that the cost can be reduced.

In addition, as illustrated in FIG. 1, the article processing apparatus 1 according to the present embodiment may include a body 50 to which the plurality of pool hoppers 11 and the plurality of weighing hoppers 12 are attached, and a plurality of the leg portions 60 attached to the body 50.

Figure 3:
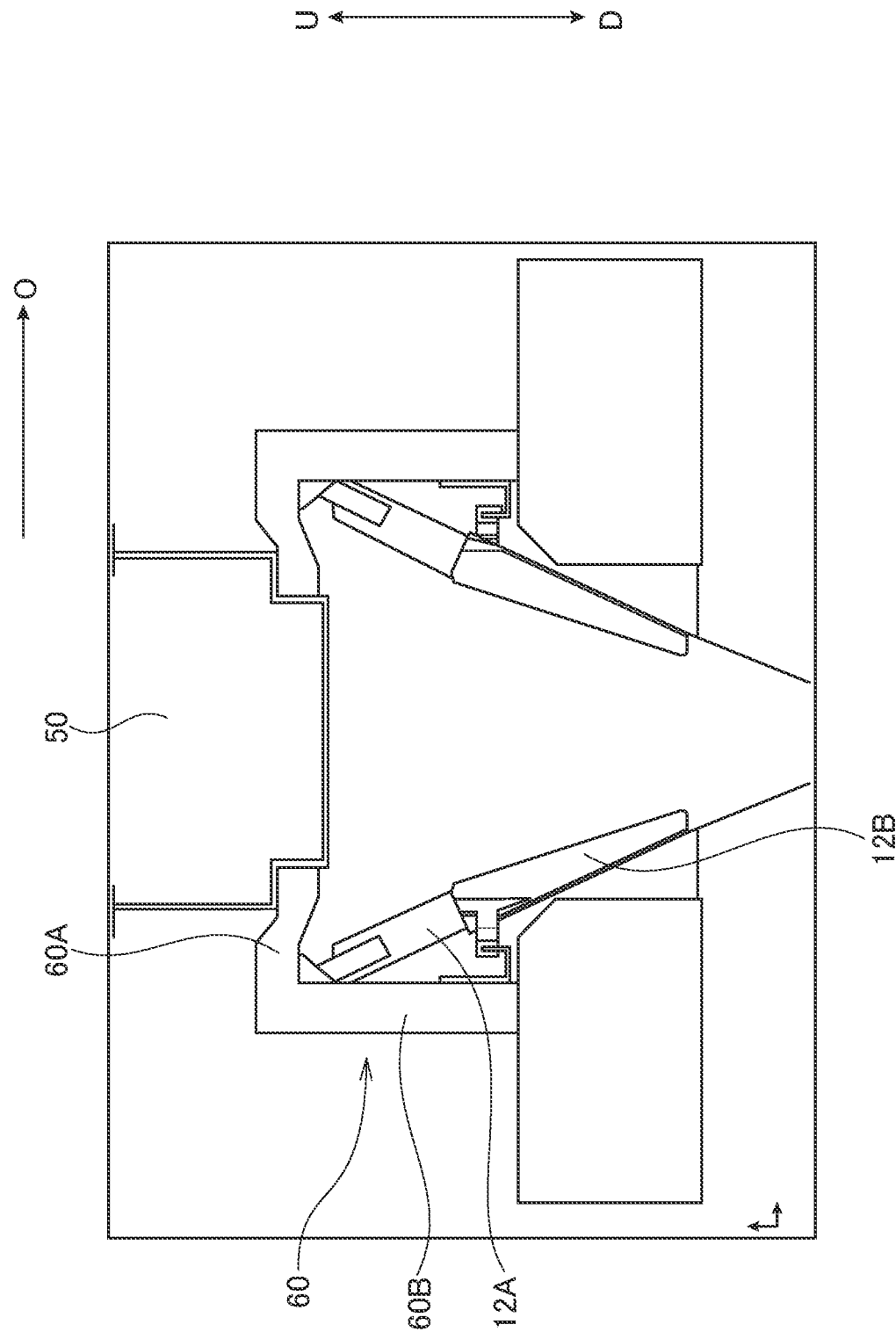
FIG. 3 is a view for describing one example of a leg portion of the article processing apparatus according to one embodiment.

Here, as illustrated in FIG. 3, each of the plurality of leg portions 60 may include a first portion 60A extending outward from the body 50, and a second portion 60B extending downward from the first portion 60A.

Incidentally, the first portion 60A may be configured to rise upward as extending outward.

According to such a configuration, since the length of the second portion 60B can be shortened, the height of the article processing apparatus 1 can be kept down.

In addition, according to such a configuration, the height of the article processing apparatus 1 can be kept down low in a state where the rigidity of the leg portions 60 is secured.

Figure 4:
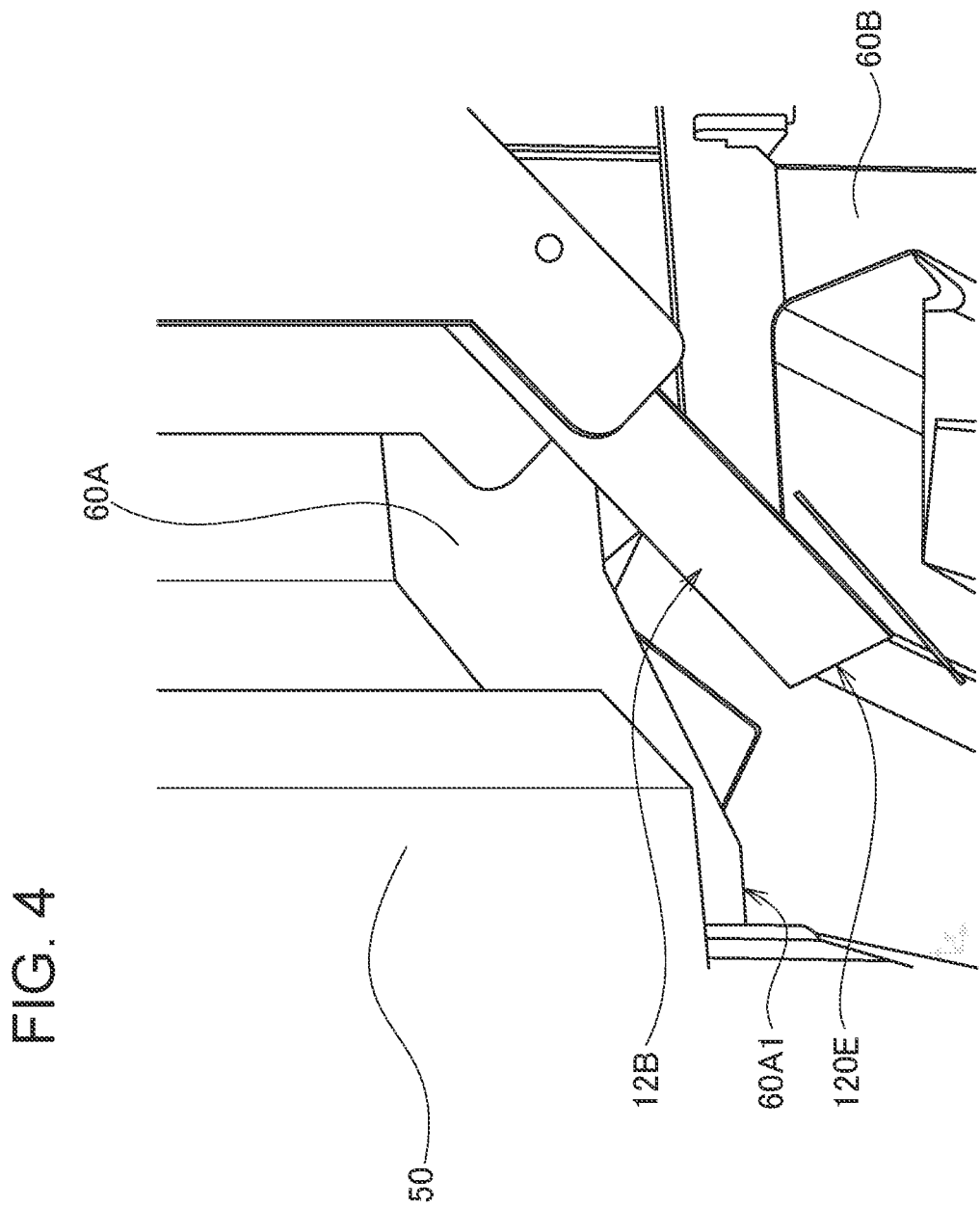
FIG. 4 is a view for describing one example of a positional relationship between the hopper and the leg portion of the article processing apparatus according to one embodiment.

As illustrated in FIG. 4, the downstream end portion 120E of the slide portion 12B may be disposed below a lower surface 60A1 of the first portion of each of the leg portions 60.

Here, as illustrated in FIG. 4, the first portion 60A may extend to the outside of the downstream end portion 120E of the slide portion 12B, and the second portion 60B may extend downward outside the downstream end portion 120E of the slide portion 12B.

According to such a configuration, a situation where the articles 100 falling from the downstream end portion 120E of the slide portion 12B collide with the lower surfaces 60A1 of the first portions of the leg portions 60 can be avoided.

Figure 5:
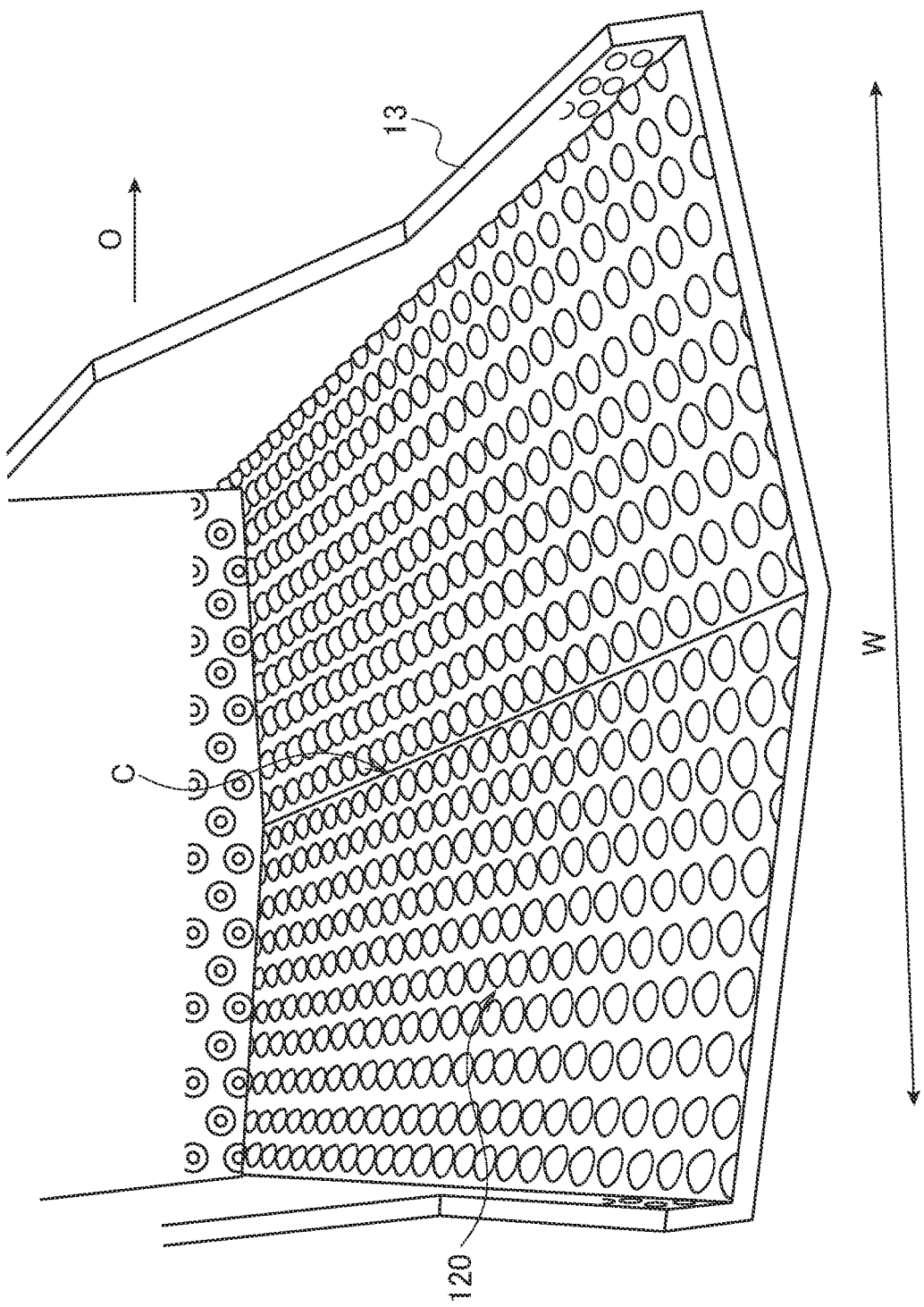
FIG. 5 is a view for describing one example of a slide surface of a slide portion of the hopper of the article processing apparatus according to one embodiment.

As illustrated in FIG. 5, the slide surface 120 may have a shape extending downward from an outside O toward a central portion C in a width direction W. For example, the slide surface 120 may have a V shape as illustrated in FIG. 5.

In the article processing apparatus 1 according to the present embodiment, since the angle A of the slide surface 120 with respect to the horizontal direction H described above is reduced, the sliding of the articles 100 becomes worse due to friction between the articles 100 and each of a side surface 121B and a side cover 13 to be described later. Therefore, such a configuration is used, the friction between the articles 100 and each of the side surface 121B and the side cover 13 to be described later can be reduced, and the sliding of the articles 100 can be improved.

Figure 6:
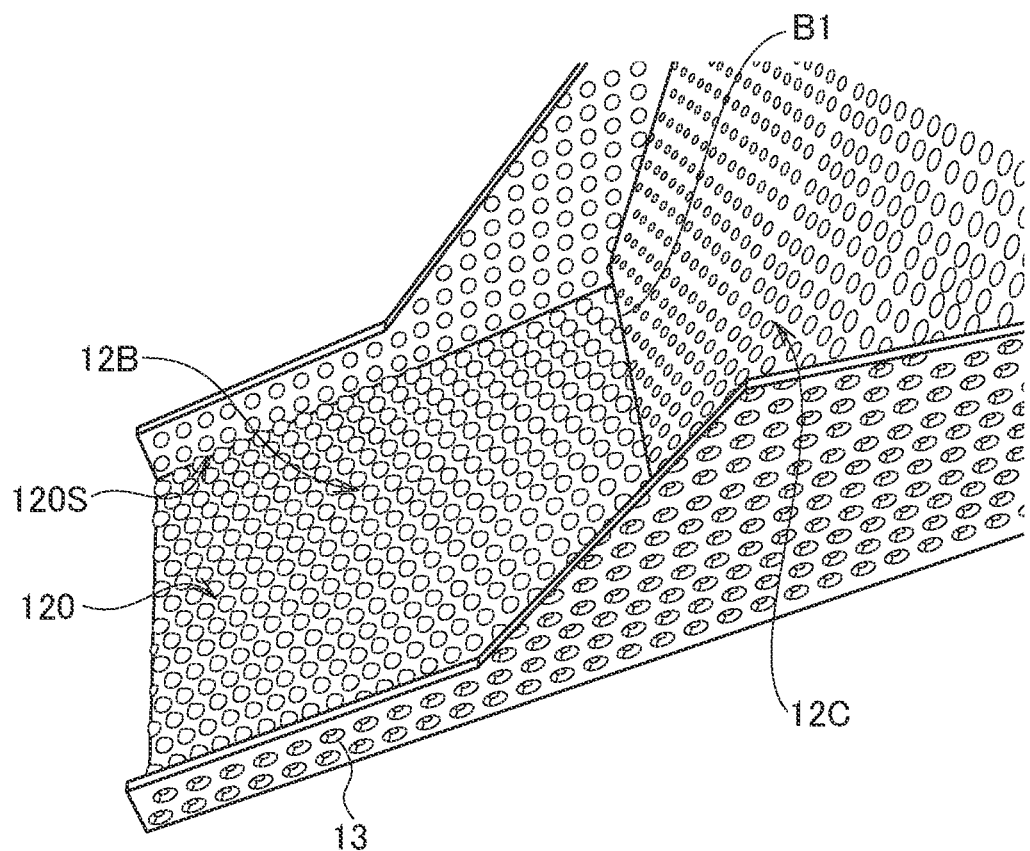
FIG. 6 is a view for describing one example of a side cover of the hopper of the article processing apparatus according to one embodiment.

As illustrated in FIG. 6, the slide portion 12B may include the side cover 13 that stands from at least a part of both side edges 120S of the slide surface 120.

Here, the slide portion 12B may include the side cover 13 over the total length of both the side edges 120S of the slide surface 120, or may include the side cover 13 at both the side edges 120S of the slide surface 120 in the vicinity of a boundary B1 between the gate 12C and the slide portion 12B.

A height of the side cover 13 may be constant. Alternatively, as illustrated in FIG. 6, a height of the side cover 13 in the vicinity of the boundary B1 between the gate 12C and the slide portion 12B may be higher than a height of the side cover 13 at other portions.

In addition, the side cover 13 may be formed by extending the side surface 121B (refer to FIG. 7) of the body portion 12A, or may be provided separately from the side surface 121B of the body portion 12A.

According to such a configuration, the articles 100 can be prevented from falling from both the side edges 120S of the slide surface 120 to the outside.

Figure 7:
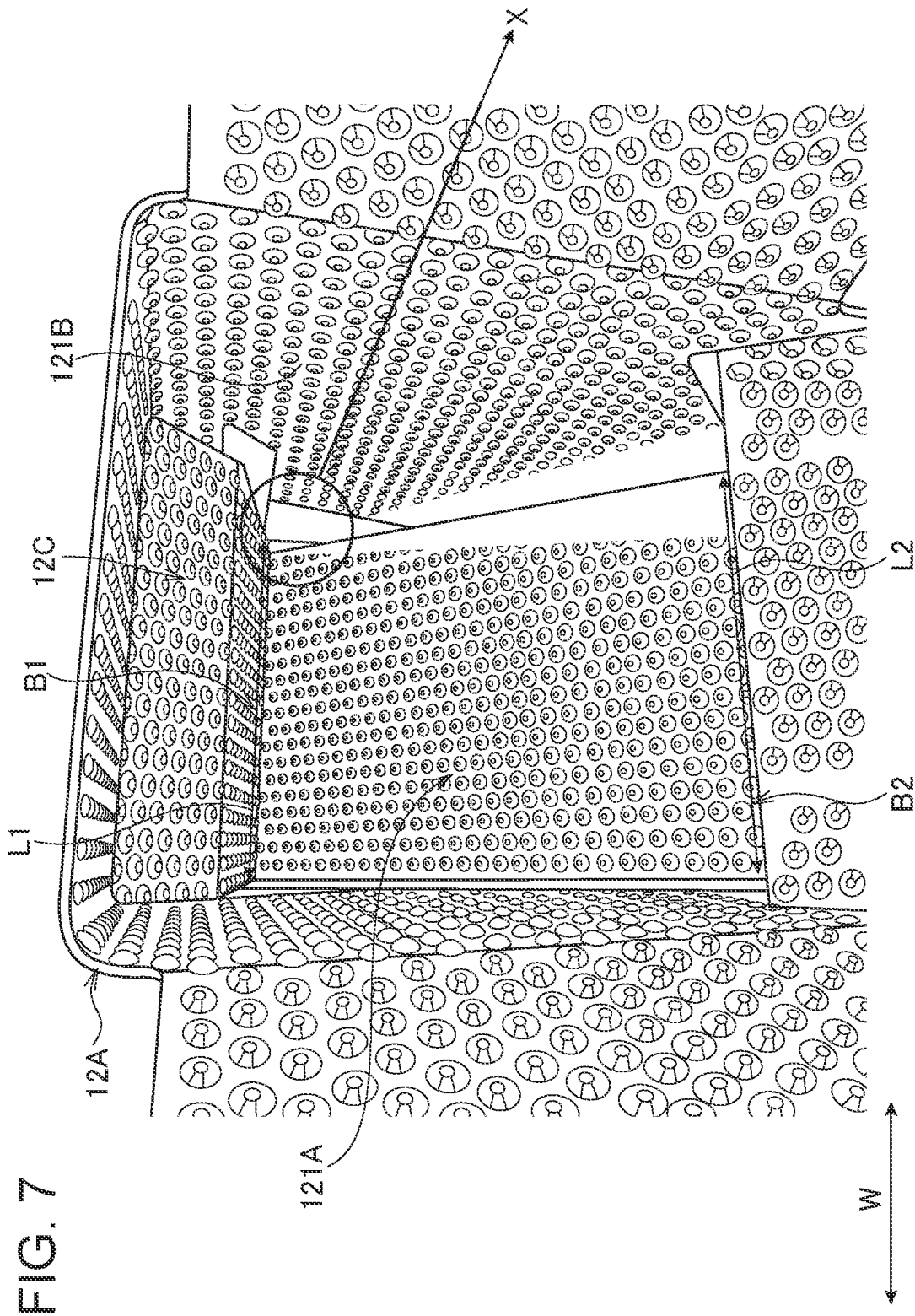
FIG. 7 is a view for describing one example of an inside of a body portion of the hopper of the article processing apparatus according to one embodiment.

As illustrated in FIG. 7, embossing may be applied to the side surface 121B of the body portion 12A. Here, the side surface 121B of the body portion 12A may have a region X to which embossing is not applied, in the vicinity of the boundary B1 between the gate 12C and the slide portion 12B.

Here, the region X may be generated by crushing some of the embossing applied to the side surface 121B of the body portion 12A or by welding a flat plate for flattening.

In the article processing apparatus 1 according to the present embodiment, since the angle A of the slide surface 120 with respect to the horizontal direction H described above is reduced, there is a high possibility of the occurrence of a state called a bridge state where the articles 100 are caught on the embossing provided on the side surface 121B of the body portion 12A.

According to such a configuration, since the region X is provided in the vicinity of the boundary B1 between the gate 12C and the slide portion 12B where such a bridge state is most likely to occur, the occurrence of such a bridge state can be suppressed.

Incidentally, as illustrated in FIG. 6, embossing may be applied to the side cover 13. Here, the side cover 13 may have a region to which embossing is not applied, in the vicinity of the boundary B1 between the gate 12C and the slide portion 12B.

According to such a configuration, similarly to the side surface 121B of the body portion 12A, the occurrence of the above-described bridge state can be suppressed.

As illustrated in FIG. 7, a length L1 of a conveying surface 121A for the articles 100 in the width direction W in the vicinity of the boundary B1 between the gate 12C and the slide portion 12B may be set to be longer than a length L2 of the conveying surface 121A for the articles 100 in the width direction W at a portion upstream of the boundary B1.

Namely, the conveying surface 121A for the articles 100 may have a reversed tapered shape (shape with a thick tip) in which the length in the width direction W increases from an upstream side toward a downstream side inside the body portion 12A.

According to such a configuration, even when the articles 100 are caught on the side surface 121B of the body portion 12A somewhere on the conveying surface 121A for the articles 100, since the length of the conveying surface 121A for the articles 100 in the width direction W increases toward the downstream side, the articles easily come off from the side surface 121B of the body portion 12A, so that the occurrence of the above-described bridge state can be suppressed.

Here, similarly to the slide surface 120, the conveying surface 121A for the articles 100 may have a shape extending downward from the outside O toward the central portion C in the width direction W.

In the article processing apparatus 1 according to the present embodiment, high-speed weighing can be performed, and the height can be kept down low.

Although the present invention is explained in detail using the above-mentioned embodiments, it will be apparent to those skilled in the art that the present invention is not limited to the embodiments described herein. The present invention can be implemented as modifications and changes without departing from the spirit and scope of the present invention defined by the description of the claims. Accordingly, the description of the present specification is for the purpose of illustration and is not intended to limit the present invention in any way.

What is claimed is:

1. An article processing apparatus in which a plurality of hoppers are disposed in a circular shape and each of the plurality of hoppers causes an article received from an upstream side to temporarily stay and then discharges the article toward a discharge opening on a downstream side, wherein
each of the hoppers includes:
a body portion;
a slide portion provided on a downstream side of the body portion, and having a slide surface extending continuously from the body portion; and
a gate provided on the body portion to switch between a first state where the gate causes the article to stay in the body portion and a second state where the gate releases the staying of the article to cause the article to slide down from the body portion,
the apparatus further comprises a chute disposed around the discharge opening, the chute being separated from the hoppers in a vertical direction by a space where the slide surface of each of the hoppers does not exist, and
the slide portion has a length or an angle with respect to a horizontal direction of a path along which the article slides down the slide surface, takes off from a downstream end portion of the slide portion, freely falls in the space where the slide surface of each of the hoppers does not exist, and then reaches the discharge opening, when the gate is in the second state.

2. The article processing apparatus according to claim 1, wherein
in a side view of the article processing apparatus, left and right end portions of the chute are located between the downstream end portion of the slide portion and a boundary between the body portion and the slide portion.

3. The article processing apparatus according to claim 1, further comprising:
a body to which the plurality of hoppers are attached; and
a plurality of leg portions attached to the body, wherein
each of the plurality of leg portions includes:
a first portion extending outward from the body; and
a second portion extending downward from the first portion.

4. The article processing apparatus according to claim 3, wherein
the downstream end portion of the slide portion is located below a lower surface of the first portion of each of the leg portions.

5. The article processing apparatus according to claim 1, wherein
the slide surface has a shape extending downward from an outside toward a central portion in a width direction.

6. The article processing apparatus according to claim 1, wherein
the slide portion includes a side cover that stands from at least a part of both side edges of the slide surface.

7. The article processing apparatus according to claim 6, wherein
embossing is applied to the side cover, and
the side cover has a region to which embossing is not applied, in the vicinity of a boundary between the gate and the slide portion.

8. The article processing apparatus according to claim 1, wherein
- embossing is applied to a side surface of the body portion, and
- the side surface of the body portion has a region to which the embossing is not applied, in the vicinity of a boundary between the gate and the body portion.

9. The article processing apparatus according to claim 1, wherein
- a length of a conveying surface for the article in a width direction in the vicinity of a boundary between the gate and the slide portion is longer than a length of the conveying surface for the article in the width direction at a portion upstream of the boundary.

\* \* \* \* \*